United States Patent
Bradley et al.

(10) Patent No.: US 10,469,335 B2
(45) Date of Patent: *Nov. 5, 2019

(54) SERVICE PLACEMENT ON HOSTS FOR A CONSUMER BASED ON THEIR GEOGRAPHIC LOCATION

(71) Applicant: International Business Machines Corporation, Armonk, NY (US)

(72) Inventors: Ivor Bradley, Belfast (GB); Timothy R. Croy, Ballymena (GB); John E. Dinger, Cary, NC (US); Matthew E. Duggan, Chertsey (GB); Randy George, Austin, TX (US); Trevor Graham, Hillsborough (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,557

(22) Filed: Jun. 23, 2018

(65) Prior Publication Data

US 2018/0302298 A1 Oct. 18, 2018

Related U.S. Application Data

(63) Continuation of application No. 14/053,984, filed on Oct. 15, 2013, now Pat. No. 10,015,061.

(30) Foreign Application Priority Data

Oct. 19, 2012 (GB) .................................. 1218822.3

(51) Int. Cl.
*H04L 12/24* (2006.01)
*H04W 4/029* (2018.01)
(Continued)

(52) U.S. Cl.
CPC .............. *H04L 41/50* (2013.01); *G06F 16/21* (2019.01); *H04L 67/1021* (2013.01);
(Continued)

(58) Field of Classification Search
CPC . H04W 24/02; H04W 28/0247; H04W 28/08; H04W 4/028; H04W 4/025;
(Continued)

(56) References Cited

U.S. PATENT DOCUMENTS

RE36,079 E  2/1999 Uddenfeldt et al.
7,023,979 B1  4/2006 Wu et al.
(Continued)

FOREIGN PATENT DOCUMENTS

WO    WO 2011/089775 A1    7/2011

OTHER PUBLICATIONS

Meng et al., "Improving the Scalability of Data Center Networks with Traffic-aware Virtual Machine Placement," IBM T.J. Watson Research Center, downloaded from <http://webcourse.cs.technion.ac.il/236635/Winter2010-2011/ho/WCFiles/9.pdf> on Apr. 22, 2015, Dec. 8, 2010.

(Continued)

Primary Examiner — Arvin Eskandarnia
(74) Attorney, Agent, or Firm — Michael P. O'Keefe; Gregory K. Goshorn; Greg Goshorn, P.C.

(57) ABSTRACT

Techniques are provided for service placement on hosts for a consumer based on geographic location The techniques include: determining a geographical location of a consumer; and inputting a topology model of an environment including multiple candidate hosts to support a service required by the consumer, the topology model including: a geographic location of each of resource in the environment; and connectivity details between the resources and between the resources and the consumer. The techniques also include: calculating the (Continued)

distance from a candidate host to the consumer; determining if a geographic requirements is met by a candidate host; and ordering candidate hosts that meet geographic requirement.

20 Claims, 4 Drawing Sheets

(51) Int. Cl.
*G06F 16/21* (2019.01)
*H04W 4/02* (2018.01)
*H04L 29/08* (2006.01)
*H04W 4/04* (2009.01)

(52) U.S. Cl.
CPC ............ *H04L 67/18* (2013.01); *H04W 4/026* (2013.01); *H04W 4/027* (2013.01); *H04W 4/029* (2018.02); *H04W 4/043* (2013.01)

(58) Field of Classification Search
CPC ... H04W 64/003; H04W 64/00; H04W 52/50; H04W 36/0083; H04W 84/18; G01S 5/0252; G01S 5/14; G06F 11/3419; G06F 11/3452; G06F 11/3457; G06F 17/509; G06F 3/0647; H04L 41/12; H04L 41/145; H04L 67/1021; H04L 67/1072; H04L 67/16; G06Q 10/08355
See application file for complete search history.

(56) References Cited

U.S. PATENT DOCUMENTS

| | | | |
|---|---|---|---|
| 7,340,769 B2 | 3/2008 | Baugher |
| 7,346,358 B2 | 3/2008 | Wood et al. |
| 7,543,045 B1 | 6/2009 | Agrawal et al. |
| 7,583,795 B1 | 9/2009 | Florence et al. |
| 7,613,447 B2 | 11/2009 | Boland et al. |
| 7,836,084 B1 | 11/2010 | Lin |
| 8,087,025 B1 | 12/2011 | Graupner |
| 8,116,291 B2 | 2/2012 | Annamalai et al. |
| 2003/0216143 A1 | 11/2003 | Roese et al. |
| 2006/0116988 A1 | 6/2006 | Toebes et al. |
| 2006/0206621 A1 | 9/2006 | Toebes et al. |
| 2008/0140850 A1 | 6/2008 | Gade et al. |
| 2008/0295094 A1 | 11/2008 | Korupolu et al. |
| 2011/0095946 A1 | 4/2011 | Castillo |
| 2011/0225277 A1 | 9/2011 | Freimuth et al. |
| 2011/0244887 A1 | 10/2011 | Dupray et al. |
| 2011/0319090 A1 | 12/2011 | Vajapeyam et al. |
| 2012/0042311 A1 | 2/2012 | Biran et al. |
| 2013/0085861 A1 | 4/2013 | Dunlap |
| 2013/0339510 A1 | 12/2013 | Douglas et al. |

OTHER PUBLICATIONS

Pietzuch et al., "Network-Aware Operator Placement for Stream-Processing Systems," Division of Engineering and Applied Sciences, Harvard University, downloaded from <http://www.doc.ic.ac.uk/~prp/doc/icde06-camera-ready.pdf> on Apr. 22, 2015, Apr. 2006.

Obraczka et al., "Network Latency Metrics for Server Proximity," USC/Information Sciences Institute, 2000.

Wikipedia, "Routing," downloaded from <http://en.wikipedia.org/wiki/Routing> on Apr. 22, 2015, last updated on Apr. 12, 2015.

Shouraboura et al., "Placement of Applications in Computing Clouds Using Voronoi Diagrams," Springer Journal if Internet Services and Applications, Special Issue: Cloud COmputing DOI 10.1007/s13174-011-0037-8, Nov. 23, 2010.

Konstantinos et al., "VM Placement in non-Homogeneous IaaS-Clouds," University of Athens, Athens, 15748, Greece.

Lakhani, "Resource Selection Strategy based upon Propagation Delay in Cloud," IEEE, 2012.

Buyya, "Modeling an Simulation of Scalable Cloud Computing Environments and the CloudSim Toolkit: Chalanges and Opportunities," IEEE, 2009.

US 10,469,335 B2

SERVICE PLACEMENT ON HOSTS FOR A CONSUMER BASED ON THEIR GEOGRAPHIC LOCATION

CROSS-REFERENCES TO RELATED APPLICATIONS

The present application is a continuation and claims the benefit of the filing date of an application entitled, "Service Placement on Hosts For a Consumer Based on Their Geographic Location" Ser. No. 14/053,984, filed Oct. 15, 2013, now U.S. Pat. No. 10,015,061, issued Jul. 3, 2018, assigned to the assignee of the present application, and herein incorporated by reference.

FIELD OF DISCLOSURE

The claimed subject matter relates generally to the field of service placement on hosts and, more specifically, to service placement on hosts for a consumer based on their geographic location.

BACKGROUND

Information technology (IT) environments featuring virtualized server, network and storage infrastructure are becoming increasingly commonplace due to the cost savings that can be obtained through reducing the amount of physical hardware needed to provide IT, network and storage services. Furthermore, cloud-based services are becoming increasingly attractive as they reduce the need to deploy and procure physical hardware, Operational Support Systems (OSS) and other systems whilst allowing consumers to adopt a "compute-on-demand" model of operation.

Virtualization technologies, such as VMware with VMotion (VMware and VMotion are trademarks of VMware, Inc.), allow virtualized resources to be moved across hosts and enabled/disabled at-will or in response to observed system metrics, such as central processing unit (CPU) load. To support these environments, cloud computing providers and operators usually use a variety of software tools to support the typical FCAPS (fault, configuration, accounting, performance, security) activities required to provision, measure and troubleshoot virtualized services and their underlying physical infrastructure. Some cloud computing providers may also offer their customers self-service portals which complicates the management process due to the unpredictable nature of compute-on-demand. Similarly, application placement, whether deployed to physical or virtualized servers and storage, is key to providing high quality services.

Service quality can be measured in numerous ways but one key factor in any measurement is the time taken, or network latency, for components of a composite service to communicate with each other. The overall network latency between networked components has many factors such as queuing delays, protocol delays and propagation delays.

Propagation delay varies depending on network medium and the physical distance between networked components. For example, in a glass fibre optic cable used to carry data, the speed of light (c) in the physical medium (s) is slowed down because it is not travelling through a vacuum and this is as a result of the refractive index of the network medium (n). For example, if the refractive index of a given fibre optic cable is 1.51, then the speed of light through it is given by:

Let c = 299,792,458 m/s    // speed of light in a vacuum
Let s = c = 299,792,458 m/s = 198,538,051.65 m/s  // speed of light in
                                                   // n 1.51
                                                   //the medium (~66% of c)

Then, using standard time-distance calculations, the theoretical propagation delay time can be calculated. For example, if the distance between London and New York is approximately 5,576 km, then the propagation delay time is approximately:

Let t=d=5,576,000 m=~0.028 seconds or 28 ms.
s 198,538,051.65 m/s

SUMMARY

According to a first aspect of the present disclosed subject matter there is provided techniques for service placement on hosts for a consumer based on geographic location, comprising: determining a geographical location of a consumer; inputting a topology model of an environment including multiple candidate hosts to support a service required by the consumer, the topology model including: a geographic location of each of resource in the environment; connectivity details between the resources and between the resources and the consumer; specifying one or more bounding requirements for a host and/or for a path between the consumer and a host; calculating the distance from a candidate host to the consumer; determining if bounding requirements are met by a candidate host; and ordering candidate hosts that meet bounding requirements by distance.

The techniques may include: periodically re-evaluating a consumer position of a moving consumer, and iteratively carrying out for the new consumer position: calculating the distance from a candidate host to the consumer; determining if bounding requirements are met by a candidate host; and ordering candidate hosts that meet bounding requirements by distance.

The techniques may include applying a velocity vector to the consumer position such that direction and speed are known to determine a next position of the consumer.

The techniques may include building a distance-ordered list of the ordered candidate hosts for selection of one or more hosts for the consumer.

The topology model may include resources in the form of one or more of the group of: processors, servers, routers, switches, storage devices, virtual machines, and other network elements.

Bounding requirements of a host may include one or more of the group of: ability to host the service, storage space, processor capacity, and other limitations of a resource.

Bounding requirements for a path between the consumer and a host may include one or more of the group of: propagation delay, serialization delay, queue delay, forwarding delay, available bandwidth, minimum latency, round trip time, and other link limitations, each being between and/or applicable to each element or along the entire path.

A path between the consumer and a host may be a full or partial path made up of known links between resources which have known characteristics.

The geographical location of the consumer and each of the resources in the topology model may be provided as a coordinate system for longitude and latitude and determined by a geographic information system. The geographical location of the consumer and each of the resources may also include altitude.

A consumer may include a group of consumers having a geographic location.

The techniques may include enabling or disabling a service for a consumer on a host based on the ordered candidate hosts.

According to a second aspect of the claimed subject matter there are provided second techniques for service placement on hosts for a consumer based on geographic location, comprising: a consumer input component for determining a geographical location of a consumer; a topology model component for inputting a topology model of an environment including multiple candidate hosts to support a service required by the consumer, the topology model including: a geographic location of each of resource in the environment; connectivity details between the resources and between the resources and the consumer; a requirement setting component for specifying one or more bounding requirements for a host and/or for a path between the consumer to a host; a distance calculating component for calculating the distance from a candidate host to the consumer; a requirement determining component for determining if bounding requirements are met by a candidate host; and a host ordering component for ordering candidate hosts that meet bounding requirements by distance.

The second techniques may include: a mobile consumer component for periodically re-evaluating a consumer position of a moving consumer; and an iterative component for iteratively carrying out the following for the new consumer position: calculating the distance from a candidate host to the consumer; determining if bounding requirements are met by a candidate host; and ordering candidate hosts that meet bounding requirements by distance.

The mobile consumer component may be for applying a velocity vector to the consumer position such that direction and speed are known to determine a next position of the consumer.

The second techniques may include a host candidate selecting component for building a distance-ordered list of the ordered candidate hosts for selection of one or more hosts for the consumer.

The second techniques may include a geographical information system for determining the geographical location of the consumer and each of the resources in the topology model and for providing the geographical locations as a coordinate system for longitude and latitude. The geographical location of the consumer and each of the resources may include altitude.

The second techniques may include a service allocating component for enabling or disabling a service for a consumer at a host based on the ordered candidate hosts.

According to a third aspect of the claimed subject matter there may be provided third techniques for service placement on hosts for a consumer based on geographic location, the third techniques comprising a computer readable storage medium having computer-readable program code embodied therewith, the computer-readable program code configures to: determine a geographical location of a consumer; input a topology model of an environment including multiple candidate hosts to support a service required by the consumer, the topology model including: a geographic location of each of resource in the environment; connectivity details between the resources and between the resources and the consumer; specify one or more bounding requirements for a host and/or for a path between the consumer to a host; calculate the distance from a candidate host to the consumer; determine if bounding requirements are met by a candidate host; and order candidate hosts that meet bounding requirements by distance.

According to a further aspects of the claimed subject matter there are provided techniques substantially as described with reference to the figures.

Viewed from a further aspect, the claimed subject matter provides a computer program product for service placement on hosts for a consumer based on geographic location, a computer readable storage medium readable by a processing circuit and storing instructions for execution by the processing circuit for performing a method for performing the claimed subject matter.

Viewed from a further aspect, the claimed subject matter provides a computer program stored on a computer readable medium and loadable into the internal memory of a digital computer, comprising software code portions, when said program is run on a computer, for performing the techniques of the claimed subject matter.

The described aspects of the claimed subject matter provide the advantage of automatically identifying optimal workload, virtual machine and application placement based on knowledge of network, server and storage topology, device and consumer geographical location and required service characteristics. Low latency is particularly critical for latency-sensitive applications such as real-time video applications.

The analysis of the geographical proximity of mobile consumers relative to a dynamically optimised service infrastructure also has advantages, such as:

1. The ability to optimise service quality for large scale gatherings, such as for major sporting events, and provide differentiated services based on location.
2. Disabling/enabling specific services for a given set of mobile consumers, for example, in response to public order disturbances.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

The claimed subject matter is particularly pointed out and distinctly claimed in the concluding portion of the specification. The claimed subject matter, both as to organization and method of operation, together with objects, features, and advantages thereof, may best be understood by reference to the following detailed description when read with the accompanying drawings.

Preferred embodiments of the claimed subject matter will now be described, by way of example only, with reference to the following drawings in which:

DETAILED DESCRIPTION

Figure 1:
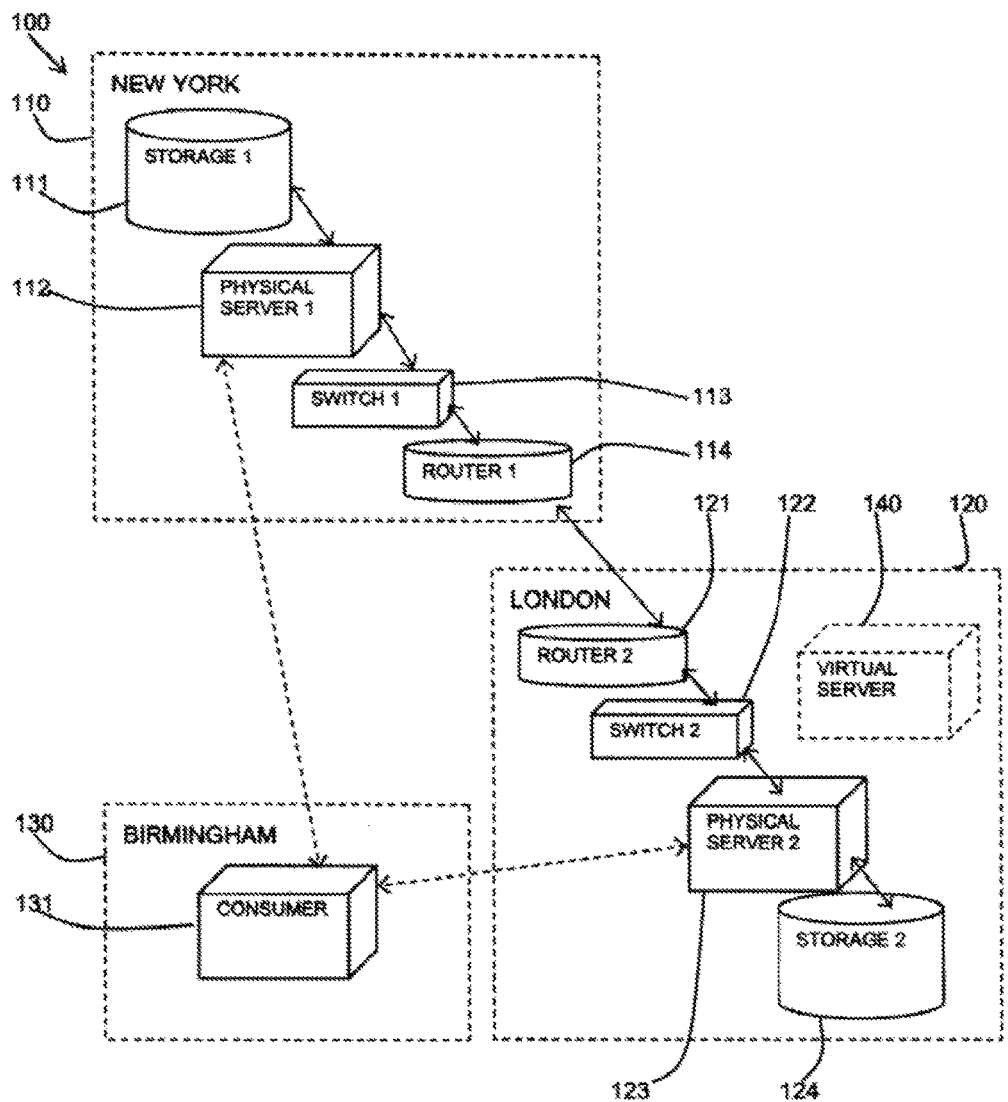
FIG. 1 is a block diagram showing an example environment in which the claimed subject matter may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

As the Inventors herein have realized, the greater the distance between two networked components, the greater the propagation delay before any actual data processing can take place. Furthermore, propagation delays are incurred for each piece of data transmitted/received and so a round-trip communication incurs the delay twice, making the previous example's Round-Trip-Time (RTT) t×2=56 ms. Available bandwidth between networked components may also be affected by geographical distance given that high capacity long-distance WAN (Wide Area Network) link services can be prohibitively expensive relative to fast, cheap and readily available LAN (Local Area Network) connections.

Service quality can therefore be improved through the geographically optimised placement of service components relative to other components and their consumers; thus increasing customer satisfaction. Another advantage of the disclosed techniques is that longer-term cost and environmental benefits are realised because geographical optimisation enables only consumer-localised resources to be used thus reducing CPU load and subsequently energy consumption of devices that would otherwise inefficiently support a given service.

Techniques are described for providing an automated suggestion of where workloads, applications and virtualized resources should be placed taking into account geographical proximity of consumers and physical hosts and desired service characteristics. The described techniques require a topology model of the environment that includes servers, routers, switches, other devices and how they are physically connected and where they are physically deployed or hosted (for example, using longitude and latitude or another suitable coordinate system) and a set of desired bounding characteristics such as propagation delay, available bandwidth and storage space and other characteristics.

The described techniques takes as an input a topology with device geographic locations and determines the most suitable location to host or disable an application, virtual machine or storage asset relative to a specified consumer within a specified criteria. The consumer may be a user, other application, group of consumers, etc. and this can be expressed as sets of latitude/longitudes as required—describing a specific location or an arbitrary geographical region. In the case of a mobile consumer or group of consumers, when following a velocity vector, the described method may be periodically re-evaluated so as to 'track' the movement of consumers and optimise service placement as required in-response to their movement.

The advantage of the described techniques is that it can determine the geographically most appropriate hosting facility to host a particular service as part of regular workload optimization calculations. Furthermore, geographically optimised application-to-application placement can be performed thus ensuring that services are deployed in a manner that will ensure low-latency and close proximity to their users whilst reducing power consumption in data centres where a service may have been previously hosted without the described method.

The described techniques work by exploiting the geographical location of managed resources and their consumers to determine optimal placement of other resources.

Bounding geographical criteria focuses on determining propagation delay which subsequently affects overall network latency and/or geographical proximity to consumers. Knowledge of how the network medium affects propagation delay is also required. Once a geographical information system has knowledge of where devices in the network are and how they are connected, an end-to-end propagation delay can be calculated relative to a consumer and subsequently used as a filter such that everything considered to be within the bounding criteria is a candidate location with others being discards. Similarly, by rearranging the calculations, geographical distance between consumers can also be used as a bounding condition, which would be useful for large scale events given that knowledge of where data centres and consumers are can be used to dynamically tune service location in response to demand.

Revisiting the previous example shows that a particular fibre optic cable with a refractive index of 1.51 would result in a propagation delay between London and New York of approximately 28 ms.

| | |
|---|---|
| Let c = 299,792,458 m/s | // speed of light in a vacuum |
| Let s = c = 299,792,458 m/s = 198,538,051.65 m/s | // speed of light in n 1.51 |
| | // the medium (~66% of c) |

Then, using standard time-distance calculations, the theoretical propagation delay time can be calculated. For instance, if the distance between London and New York is approximately 5,576 km, then the propagation delay time is approximately:

Let t=d=5,576,000 m=~0.028 seconds or 28 ms.
s 198,538.051.65 m/s

This figure is best theoretical case and is only one part of the delay equation given it does not take into account other factors, which is shown by a ping from London to Cornell University (assuming it is in New York) which currently has a Round Trip Time (RTT) of ~113 ms. This figure is plausible given the numerous machines, queues and protocols (etc) involved outside of the propagation delay.

There is clearly going to be a significant reduction in propagation delay for closer distances. London to Birmingham (for instance) is only 163 km and so the propagation delay is only 0.82 ms thus clearly benefiting consumers of services in either city.

| | |
|---|---|
| Let c = 299,792,458 m/s | // speed of light in a vacuum |
| Let d = 163,000 m | // 163 km between London and Birmingham |
| Let n = 1.51 | // attenuation c as a result of network medium, 66% for this fibre |

-continued

```
Let t =  d   = 163,000m        = 0.00081 seconds
    (s = c/n) (299,792,458 m/s/1.51)
       (0.81 ms one-way or 1.62 ms RTT)
```

Referring to FIG. 1, a block diagram shows an example environment 100 in which the described method and system may be implemented. In FIG. 1, a geographically diverse network consists of components in New York 110, USA, London 120, UK and Birmingham 130, UK. The components in New York 110 include a first storage 1 111, a physical server 1 112, a first switch 1 113, and a router 1 114. The components in London 120 include a second storage 2 121, a physical server 2 122, a second switch 2 123, and a second router 2 124. A consumer 131 is based in Birmingham 130.

A virtual machine 140 may be hosted in either New York 110 or London 120. A calculation of the distance and latency of using a virtual machine 140 in both New York 110 and London 120 may be calculated and the optimum location selected for the consumer 131.

Figure 2:
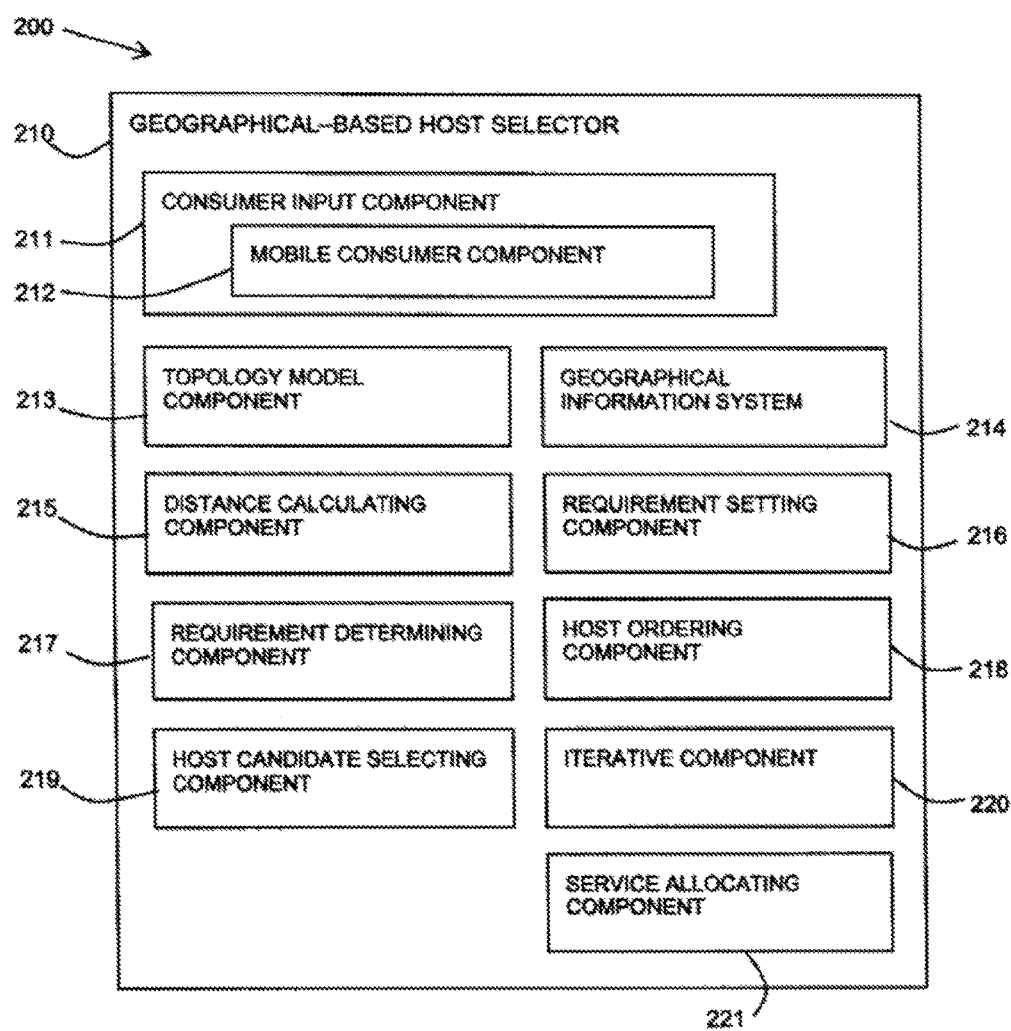
FIG. 2 is block diagram of an example embodiment of a system in accordance with the disclosed technology.

Referring to FIG. 2, a block diagram shows an example embodiment of the described system 200. The described system 200 may include a geographical-based host selector 210 for selecting a host for a service for a consumer. The selector 210 may include a consumer input component 211 for receiving as an input the consumer location. A consumer may be a single consumer of a set or group of consumers. The consumer location may include the latitude and longitude coordinates of where the consumer is, including altitude, floor location, etc. if required. The consumer input component 211 may include a mobile consumer component 212 for use with mobile consumers in which a velocity vector may be applied to a consumer such that direction and speed of movement are known such that a determination of likely location can be made. The mobile consumer component 212 when following a velocity vector may periodically re-evaluated the consumer's position so as to track the movement of the consumer. The likely location may be 'hard wired' for fixed large scale events.

The selector 210 may also include a topology model component 213 for receiving as input or generating a topology model of resources including candidate hosts for providing a service to the consumer. The topology model may include servers, routers, switches, other devices and how they are physically connected and where they are physically deployed or hosted (longitude and latitude or another suitable coordinate system). Location information may be applied to the topology in a number of ways, such as geocoding of public IP addresses, postal addresses or via GPS hardware attached to managed devices.

The system 200 may include a geographical information system 214 for determining the geographical location of the consumer and resources in the topology model.

The selector component 210 may also include a requirement setting component 216 for specifying bounding requirements for a host and/or bounding requirements for a path between the consumer to a host. The settings may include a set of desired bounding characteristics such as propagation delay, available bandwidth and storage space and other characteristics.

The selector component 210 may include a distance calculating component 215 for calculating the geographical distance between the consumer and the candidate hosts. The distance calculating component 215 may be a spatially enabled database, such as IBM® DB2® Spatial, or appropriate code to perform accurate distance and other geographically related calculations.

Coordinate systems for resources and the consumer may typically be in the form of a WGS84 (World Geodetic System) latitude and longitude, as used by many systems. Alternative coordinate systems can also be used provided GIS calculations, take them into account and return accurate distances in common distance units such as meters, kilometers, feet and miles.

Knowledge of the latitude and longitude, and optionally altitude (for example, floor level in a building), of where each physical resource is located may be obtained. For example, in IBM Tivoli® Network Manager (IBM, DB2, and Tivoli are trademarks of International Business Machines Corporation, registered in many jurisdictions worldwide), the 'chassis' table (which describes the existence of a device) could be extended to include an appropriate geometry/geographic type column that holds latitude, longitude and, optionally, altitude thus enabling a geographic information system database to use it as part of its calculations.

The selector component 210 may also include a requirement determining component 217 for determining if bounding requirements are met by a candidate host. For example, a bounding requirement may be a propagation delay between the consumer and candidate hosts and once the geographic information system 221 has knowledge of where devices in the network are and how they are connected, an end-to-end propagation delay may be calculated relative to a consumer. For example, the propagation delay may be increased to take into account the overhead imposed by queues, forwarding and protocols providing appropriate candidates hosts are in the target geographical vicinity.

The selector component 210 may include a host ordering component 218 for ordering the candidate hosts according to the distance to consumer, and meeting of bounding requirements. A host candidate selecting component 219 may be provided for automatically or manually selecting one or more candidate hosts for a consumer.

A service allocating component 221 may be provided for enabling or disabling services for a consumer from hosts as appropriate based on the candidate host order.

The described system may be implemented in any suitable programming language, such as Java®, or C++, and will require a database of topology and location information which could be held in a file system or relational database management system (RDBMS). A spatially enabled database, such as IBM DB2 Spatial, may be used to simplify GIS related queries but it is conceivable that such calculations could be implemented outside of the database and in application code if required. Java and all Java-based trademarks and logos are trademarks or registered trademarks of Oracle and/or its affiliates.

Figure 3:
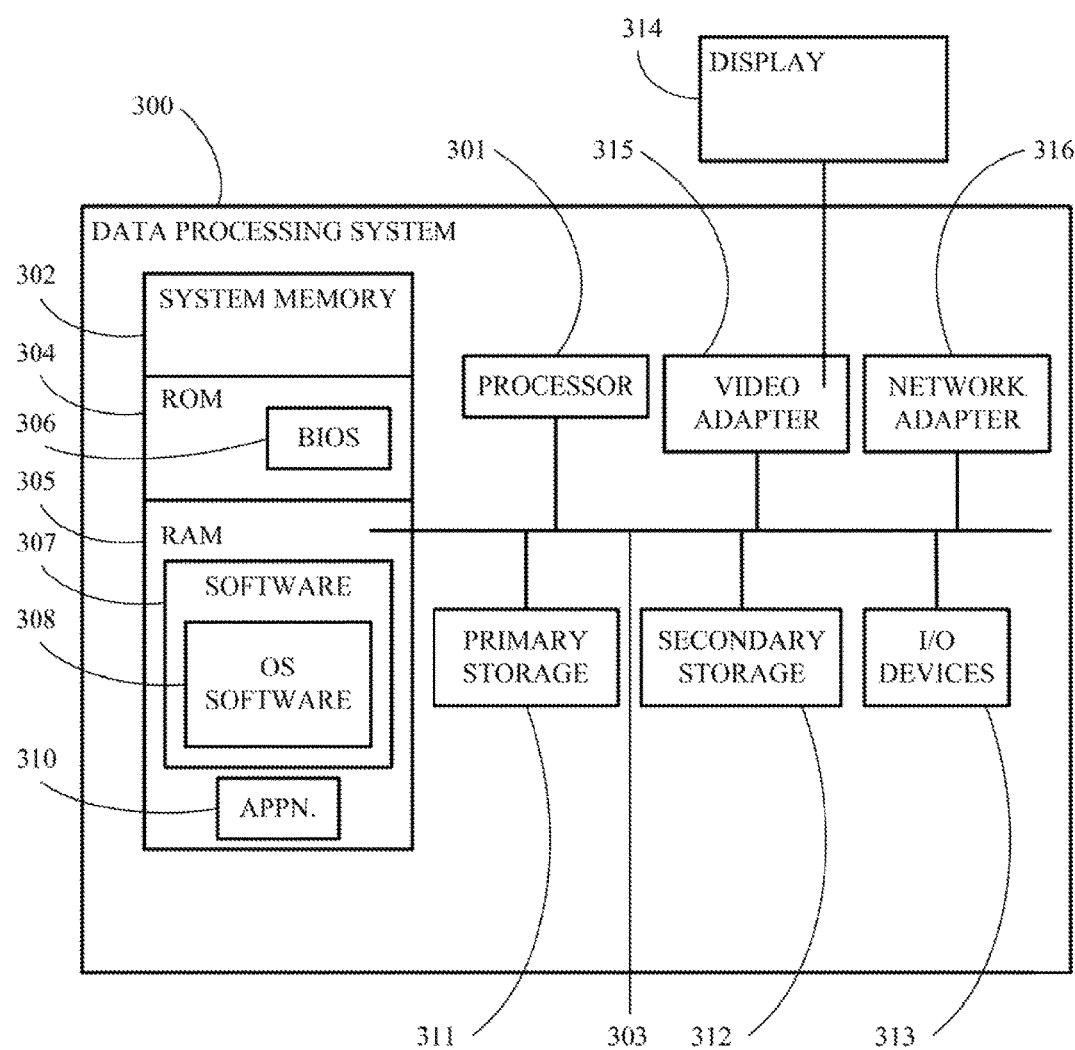
FIG. 3 is a block diagram of an embodiment of a computer system in which the claimed subject matter may be implemented.

Referring to FIG. 3, an exemplary system for implementing aspects of the claimed subject matter includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
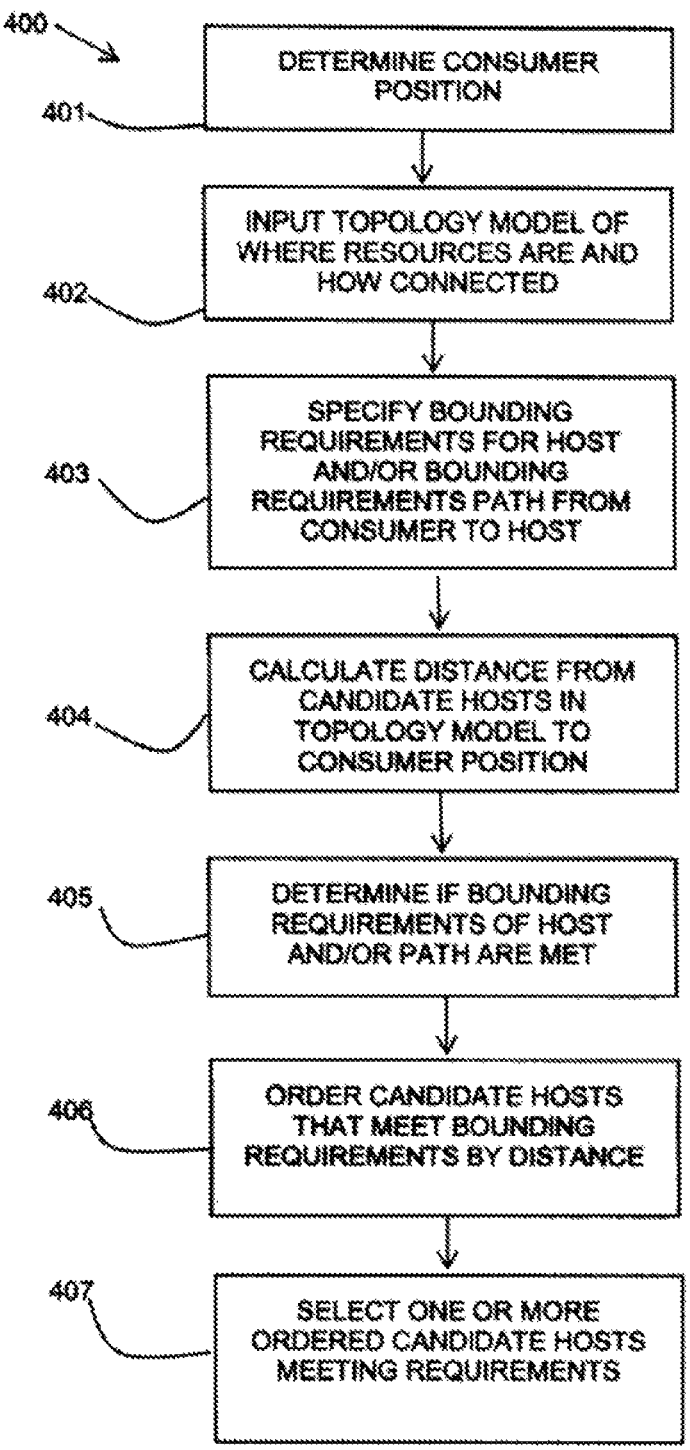
FIG. 4 is a flow diagram of an example embodiment of an aspect of a process in accordance with the claimed subject matter.

Referring to FIG. 4, a flow diagram 400 shows an embodiment of the described method for service placement on hosts for a consumer based on geographic location.

The method may include determining 401 a geographical location of a consumer for which the service is required. A consumer may be a group of consumers with a set of geographical locations. The group may be treated as a box or polygon-bounded region and then a host resource closest to the region as a whole may be chosen.

A topology model may be input 402 or generated of an environment including multiple candidate hosts to support a service required by the consumer. The topology model may include: a geographic location of each of resource in the environment; and connectivity details between the resources and between the resources and the consumer. The topology model may include resources in the form: processors, servers, routers, switches, storage devices, virtual machines, and other network elements.

One or more bounding requirements may be specified 403 for a host and/or for a path between the consumer and a host.

For example, bounding requirements of a host may include: ability to host the service, storage space, processor capacity, and other limitations of a resource.

Bounding requirements for a path between the consumer and a host may include: propagation delay, serialization delay, queue delay, forwarding delay, available bandwidth, minimum latency, round trip time, and other link limitations, each being between each element or along the entire path. A bounding requirement of a path may also include the distance of the path, regardless of topology, or may include the topology up to the end point towards a consumer.

A path may also be a partial path between a candidate host and the consumer. A partial path may be present if, for example, a resource owner has a resource in London and a consumer in Liverpool but the communications needs to traverse some set of devices that they do not manage, and so cannot see them. A full path may be present if the resource owner owns all of the devices between the consumer and a candidate host or resource. In either case, the geographical locations of the consumer and resources remains key as firstly, it is typically desirable for the consumer to obtain services from hosts that are physically close to them, and secondly, assumptions can be made as to the characteristics of the network in the event of a partial path being present.

As a further example, consider a mobile consumer wishing to use their smart phone to obtain services from an online commerce company who have a number of physical locations from which they can host their services. Assume that the online commerce company do not own the mobile phone network and, as a result, only partial information about the path between the consumer and their candidate hosts is available. In this case, the online commerce company can make use of the geographical locations of the consumer and resources, the data they do have about the connectivity between them (such as their server, a first network switch and a first network router toward in their data centre); and they can deduce that the consumer is using a mobile phone. This information is sufficient to allow them to host geographically optimised services as they can make assumptions about the characteristics of the mobile phone operator's radio access network.

Either one or more bounding requirements of a host, or a path between a host and the consumer may be taken into account. Alternatively, a combination of bounding requirements of both host and path may be considered.

The distance may be calculated 404 from a candidate host to the consumer. This may be carried out by a geographic information system. This may be the direct geographical distance between the candidate host and the consumer.

It may then be determined 405 if bounding requirements are met by a candidate host.

Candidate hosts that meet bounding requirements may be ordered 406 by distance to the consumer.

A distance-ordered list of candidate hosts may be built, and one or more of the candidate hosts may then be programmatically or manually selected 407. More than one resource host may be selected, if needed. Services may be allocated or disabled on hosts based on the ordered candidate hosts.

If a consumer, or group of consumers is mobile, the consumer position may be periodically re-evaluated and the actions of 404 to 407 may be iteratively re-calculated taking into account the new consumer position. Re-evaluating a consumer position may apply a velocity vector to the consumer position such that direction and speed are known to determine a next position of the consumer.

The following describes the method from start-to-finish for a number of scenarios. Pseudo-code is used to depict logic that may be used to implement the method.

Scenario A

A consumer requires a virtual machine to be hosted such that they have minimal latency (RTT) between them and the virtual machine. This requires the nearest candidate resource to be found irrespective of topology given that the topology between the consumer and resources in unknown. However, a validation check can be made of the RTT to possible candidates as a verification mechanism given that the RTT of candidates physically close to the consumer should be lower by virtue of lower propagation delays.

Let consumer = The latitude and longitude of the consumer or a group of consumers.
Let creq = minimal latency and ability to host VM
Let t = the known physical topology of network, server and storage resources and their physical locations.
Let tlocal[ ] = the set of resources in t that meet creq. // can meet the requirement
// to build tlocal..., find all of the elements in the topology that are nearest to the consumer, first 10 in this case...
```
Let candidates[ ] =
SELECT candidate.id,
    CAST(ST_Distance(candidate.geometry,
        ST_GeomFromText('POINT(consumer.latitude,
consumer.longitude), 'KILOMETRE') AS DECIMAL(10,4)) AS distance
FROM chassis AS candidate
WHERE candidate.canhostvm = TRUE
ORDER BY distance ASC
FETCH FIRST 10 ROWS ONLY;
id              distance
-----------------------------------------
physical server 2       164         <------ * best candidate *
physical server 1       5567
Therefore:-
for each candidate in candidates[ ]
{
    let looksgood = validate candidate meets creq
    il(looksgood)
    {
        add candidate to tlocal[ ];
    }
}
```

Once "tlocal" has been populated an automated or manual decision can be made as to where the virtual machine can be placed, in this case on physical server 2 located in London.

Scenario B

A consumer requires a virtual machine to be hosted such that they have minimal latency (RTT) between them and the VM and meeting a minimal link bandwidth requirement of Xkbps. In this case, it is assumed that the topology between the consumer and candidate resources is known and that the path between the consumer and the geographically closest host cannot meet the bandwidth requirements and so New York is the nearest suitable candidate despite being far away.

```
Let consumer = The latitude and longitude of the consumer or group of
consumers.
Let creq = minimal latency, minimal link bandwidth X and ability to host
VM.
Let t = the known physical topology of network, server and storage
resources and their physical locations.
Let tlocal[ ] = the set of resources in t that meet creq.
// to build tlocal..., find all of the elements in the topology that are nearest
to the consumer (note it is in the topology), first 10 in this case
// but also check the path between each candidate and consumer meets the
reqs at each link.
Let candidates[ ] =
SELECT candidate.id,
       consumer.id AS cid,
    CAST(ST_Distance(candidate.geometry,consumer.geometry),
'KILOMETRE') AS DECIMAL(10,4)) AS distance
FROM chassis AS candidate
WHERE candidate.canhostvm = TRUE
ORDER BY distance ASC
FETCH FIRST 10 ROWS ONLY;
id      cid      distance
---------------------------------------------------------------
physical server 2       consumer    164    <------ * best
geographically local candidate *
physical server 1       consumer    5567   <------ * this
will be the best geographically local candidate that can meet bandwidth
reqs. *
Therefore:-
foreach candidate in candidates[ ]
{
    let path[ ] = nodes in t between candidate.id and candidate.cid
(consumer)
    let includeCandidate = true; // default until proven otherwise
    foreach pair nodes {A,B} in path[ ]
    {
        if link {A,B}.bandwidth does not meet creq
        {
            includeCandidate = false;
            break;
        }
    }
    if(includeCandidate = TRUE)
    {
        add candidate to tlocal[ ];
    }
}
```

In this case "tlocal" would contain just physical server 1 because the path between the consumer and it can meet the bandwidth requirements. This example becomes more compelling if another host, physical server 2, was available in California as the geographical proximity to the consumer then makes a difference.

Scenario C

A consumer requires a virtual machine to be hosted such that they have minimal latency (RTT) between them and the VM. The topology between the consumer and candidate resources is known and the network medium details for each link (i.e. refractive index or equivalent) are also known. The overall RTT must not exceed Yms and so it needs to be ensured that candidates are able to host the VM with the lowest possible propagation delay given the additional overhead imposed by queues, forwarding and protocols. It is assumed that the RTT is 400% of the propagation delay.

```
Let c = 299,792,458 m/s          // speed of light in a vacuum
Let s = c ÷ 299,792,458 m/s = 198,538,051.66 m/s // speed of light in n
1.51
the medium (~66% of c)
```

Then, using standard time-distance calculations, the theoretical propagation delay time can be calculated. For instance, if the distance between London and New York is approximately 5,576 km, then the propagation delay time is approximately:

```
Let t = d = 5,576,000 m        = ~0.028 seconds or 28 ms.
        s   198,538,051.66 m/s
Let consumer = The latitude and longitude of the consumer or group of
consumers.
Let creq = maximum allowable RTT latency between the consumer and
host.
Let t = the known physical topology of network, server and storage
resources and their physical location.
Let tlocal[ ] = the set of resources in t that meet creq.
// to build tlocal..., the topology and network medium characteristics are
known and so cumulatively
// determine propagation delay on a per-link-pair basis to determine the
overall propagation delay between
// the consumer and candidate hosts. Only retain hosts such that 400%
of the overall propagation delay is <= Yms.
//1. Get the paths between the consumer and devices known to be able to
host their VM and also get the distance between
// each end of each link, i.e. path = {AB,BC,DE} then distances would be
available for AB, BC, DE. The connections
// record includes the network characteristic n. Get it by shortest-path
order
first...
Let pairsOfLinks[ ]=
SELECT path,   // the path
    connections,   // the connections in the path
    CAST(ST_Distance(candidate.geometry,
        connection.farend.geometry), 'KILOMETRE') AS
DECIMAL(10,4)) AS distance
FROM path,
INNER JOIN topology AS connections ON connection.pathId =
path.pathId
```

-continued

```
WHERE connection.type = 'physical'
AND connection.start = consumer
AND connection.end.canhostvm = TRUE
ORDER BY SUM(distance) ASC
FETCH FIRST 10 ROWS ONLY;
//2. Go through the set of links and use the distance and network
characteristic to work out the assumed RTT latency...
for each unique path in pairsOfLinks[ ].path
{
    Let rtt = 0 ms;
    For each connection in pairsOfLinks[ ]
    {
        Let pathId = connection.pathId; // the id of this set of links
between the consumer and candidate.
        Let n = connection.networkCharacteristic;   // i.e. 1.51 for
the fibre.
        Let d = distance(connection.start, connection.end); //
distance in metres for this link
        // figure out the RTT based on our assumption, s and
distance:-
        Let s = c =   299,794,258 m/s = s m/s
              n   n
        Let t ms = d
                  s
        rtt.add(t)
        if(400% of rtt.current value >= Yms)
        {
            last;   // go onto next path if it is breached already...
        }
    }
    // if the rtt looks good, add this candidate to tlocal...
    if(400% or rtt.current value <= Yms)
    {
        add path.farend to tlocal[ ]   // keep this host, overall RTT
is less than or equal to Yms
    }
}
```

In this case, tlocal would only contain host candidates for which the entire path between them and the consumer falls within the acceptable Yms RTT. Once the candidates have been determined, an automated or manual selection as to the most appropriate host can be made for service enablement or cessation as required.

Scenario D

A variant of any of the above scenarios would be to take into account consumer movement by looking at their velocity vector to calculate a new position in X time such that a re-evaluation of the optimal service placement and subsequent enablement/cessation can be made. This particular scenario has applications in ensuring sufficient compute resources are available for large crowds at major sporting events or preventing service use in the event of public disorder.

The described method requires explicit knowledge about the underlying network as provided by the topology model. The described method is interested in exploiting known characteristics about the network because it materially affects the theoretical latency between a consumer and a host.

Potential paths between a consumer and a host may be generated by routing algorithms or may be generated manually, or from another source. The described method does depend on how a path was calculated between a consumer and a host—just that there is one and information is known about each step along the path, i.e. characteristics such as distance and media. The problem with routing algorithms is that all traffic between two points is typically routed along the same path, which is considered the optimum path by the algorithm, despite there being plenty of alternate capacity available in the network.

The claimed subject matter can take the form of an entirely hardware embodiment, an entirely software embodiment or an embodiment containing both hardware and software elements. In a preferred embodiment, the claimed subject matter is implemented in software, which includes but is not limited to firmware, resident software, microcode, etc.

The claimed subject matter can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present claimed subject matter.

We claim:

1. A method, comprising:
   determining a geographical location of a consumer;
   inputting a topology model of an environment including multiple candidate hosts to support a service required by the consumer, the topology model comprising;
      a geographic location of each resource of a plurality of resources in the environment; and
      connectivity details between each of the plurality of resources and between each of the plurality of resources and the consumer;
   specifying bounding requirements for the candidate hosts and corresponding paths between the consumer and the candidate hosts,
   calculating a corresponding geographical distance from each candidate host of the multiple candidate hosts to the consumer;
   determining, based upon the corresponding geographical distances, that bounding requirements are met by a subset of the candidate hosts; and
   ordering the subset of candidate hosts by the corresponding geographical distances.

2. The method of claim 1, further comprising:
   periodically re-evaluating the geographical position of the consumer to determine the consumer is moving; and
   in response to determining that the consumer is moving, iteratively for the new consumer position:
      calculating, the distance Ervin a candidate host to the consumer;
      determining if bounding requirements are met by a candidate host; and
      ordering candidate hosts that meet bounding requirements by distance.

3. The method of claim 2, further comprising applying a velocity vector to the consumer position such that direction and speed are known to determine a next position of the consumer.

4. The method of claim 1, further comprising building a distance-ordered list of the ordered candidate hosts for selection of one or more hosts for the consumer.

5. The method of claim 1, wherein the bounding requirements for a path between the consumer and a host are selected from a list, the list comprising:
   a geographical distance between the host and the consumer;
   propagation delay;
   serialization delay;
   queue delay;
   forwarding delay;
   available bandwidth
   minimum latency; and
   round trip time.

6. The method of claim 1, further comprising enabling a service for a consumer on a host based on the ordered candidate hosts.

7. The method of claim 1, further comprising disabling a service for a consumer on a host based on the ordered candidate hosts.

8. An apparatus, comprising:
   a processor;
   a non-transitory, computer readable storage medium coupled to the processor; and
   logic, stored on the computer-readable storage medium and executed on the processor, for:
      determining a geographical location of a consumer;
      inputting a topology model of an environment including multiple candidate hosts to support a service required by the consumer, the topology model comprising:
         a geographic Location of each resource of a plurality of resources in the environment; and
         connectivity details between each of the plurality of resources and between each of the plurality of resources and the consumer;
      specifying bounding requirements for the candidate hosts and corresponding paths between the consumer and the candidate hosts;
      calculating a corresponding geographical distance from each candidate host of the multiple candidate hosts to the consumer;
      determining, based upon the corresponding geographical distances, that bounding requirements are met by a subset of the candidate hosts; and
      ordering the subset of candidate hosts by the corresponding geographical distances.

9. The apparatus of claim 8, the logic further comprising logic for:
   periodically re-evaluating geographical position of the consumer to determine the consumer is moving; and
   in response to determining that the consumer is moving, iteratively for the new consumer position:
      calculating the distance from a candidate host to the consumer;
      determining if bounding requirements are met by a candidate host; and
      ordering candidate hosts that meet bounding requirements by distance.

10. The apparatus of claim 9, the logic further comprising logic for applying a velocity vector to the consumer position such that direction and speed are known to determine a next position of the consumer.

11. The apparatus of claim 8, the logic further comprising logic for building a distance-ordered list of the ordered candidate hosts for selection of one or more hosts for the consumer.

12. The apparatus of claim 8, wherein the bounding requirements for a path between the consumer and a host are selected from a list, the list comprising:
   a geographical distance between the host and the consumer;
   propagation delay;
   serialization delay;
   queue delay;
   forwarding delay;
   available bandwidth
   minimum latency; and
   round trip time.

13. The apparatus of claim 8, the logic further comprising logic for enabling a service for a consumer on a host based on the ordered candidate hosts.

14. The apparatus of claim 8, the logic further comprising logic for disabling a service for a consumer on a host based on the ordered candidate hosts.

15. A computer programming product, comprising:
   a non-transitory, computer readable storage medium; and
   logic, stored on the computer-readable storage medium for execution on a processor, for:
      determining a geographical location of a consumer;
      inputting a topology model of an environment including multiple candidate hosts to support a service required by the consumer, the topology model comprising:
         a geographic location of each resource of a plurality of resources in the environment; and
         connectivity details between each of the plurality of resources and between each of the plurality of resources and the consumer;
      specifying hounding requirements for the candidate hosts and corresponding paths between the consumer and the candidate hosts;
      calculating a corresponding geographical distance from each candidate host of the multiple candidate hosts to the consumer;
      determining, based upon the corresponding geographical distances, that bounding requirements are met by a subset of the candidate hosts; and
      ordering the subset of candidate hosts by the corresponding geographical distances.

16. The computer programming product of claim 15, the logic further comprising logic for:
   periodically re-evaluating the geographical position of the consumer to determine the consumer is moving; and
   in response to determining that the consumer is moving, iteratively for the new consumer position:
      calculating the distance from a candidate host to the consumer;
      determining if hounding requirements are met by a candidate host; and
      ordering candidate hosts that meet hounding requirements by distance.

17. The computer programming product of claim 16, the logic further comprising logic for applying a velocity vector to the consumer position such that direction and speed are known to determine a next position of the consumer.

18. The computer programming product of claim 15, the logic further comprising logic for building a distance-ordered list of the ordered candidate hosts for selection of one or more hosts for the consumer.

19. The computer programming, product of claim 15, wherein the bounding requirements for a path between the consumer and a host are selected from a list, the list comprising:
- a geographical distance between the host and the consumer;
- propagation delay;
- serialization delay;
- queue delay;
- forwarding delay;
- available bandwidth
- minimum latency; and
- round trip tune.

20. The computer programming product of claim 15, the logic further comprising logic for enabling a service for a consumer on a host based on the ordered candidate hosts.

* * * * *